Sept. 12, 1933.  B. C. YOUMAN  1,926,417
FISH CLEANING MECHANISM
Filed March 3, 1930
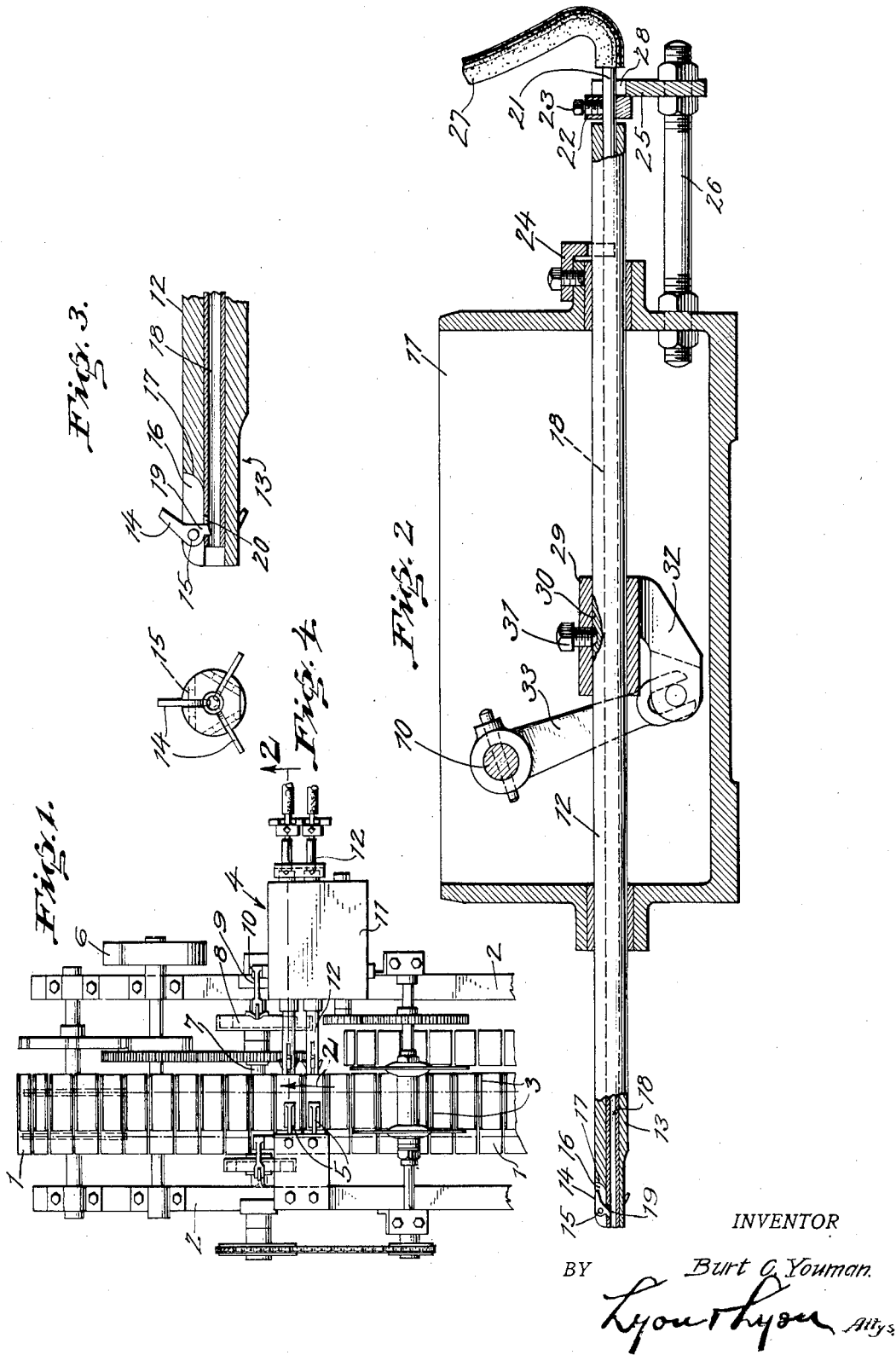
INVENTOR
Burt C. Youman
BY
Lyon Lyon Attys Patented Sept. 12, 1933

1,926,417

UNITED STATES PATENT OFFICE 1,926,417

FISH CLEANING MECHANISM

Burt C. Youman, San Francisco, Calif., assignor to California Packing Corporation, San Francisco, Calif., a corporation of New York Application March 3, 1930. Serial No. 432,640

11 Claims. (Cl. 17—3)

This invention relates to a fish cleaning mechanism intended to be used in a type of machine in which a fish's body is presented to the cleaning mechanism in a longitudinally aligned relation so that the cleaning means can pass longitudinally into the fish's body. Heretofore cleaning mechanism for this purpose has been employed in the form of an auger which is rotated while disposed within the fish's body in such a way as to pick up and entangle the viscera of the fish. Upon the return stroke of the auger the viscera are removed from the fish's body.

It is desirable to provide means for delivering a stream of rinsing water at the forward end of the extracting device or auger; but where the auger rotates as suggested above, it becomes necessary to provide a swivel connection for carrying the water to the auger.

The general object of this invention is to provide fish cleaning mechanism for performing this function which can be operated at a relatively high speed, thereby increasing the capacity of such machines, and which has a construction which avoids the necessity for rotating the auger or extractor and, also, to provide a machine of this type having simple means for delivering a rinsing stream of water at the forward end, or extracting head, of the mechanism.

A further object of the invention is to provide a construction of this kind which is readily adapted for the operation of a plurality of "augers" or extracting devices controlled in a gang or multiple arrangement.

Further objects of the invention will appear hereinafter.

The invention consists in the novel parts and combinations of parts to be described hereinafter, all of which contribute to produce an efficient fish cleaning mechanism.

A preferred embodiment of the invention is described in the following specification, while the broad scope of the invention is pointed out in the appended claims.

In the drawing:

Figure 1 is a plan upon a reduced scale, showing a short portion of an automatic fish cleaning machine embodying my invention.

Figure 2 is a longitudinal section taken about on the line 2—2 of Figure 1, but omitting the cover of the casing that is shown in section, and showing certain parts broken away and partly in section. This view illustrates the forward end of the cleaning member with its expanding head in a folded relation, adapted to pass readily into the fish's body.

Figure 3 is a longitudinal vertical section taken through the forward end of the extractor and on a larger scale, broken away and illustrating the expander head of the device in its expanded relation, which it assumes during the rear stroke of the extractor to withdraw the viscera of the fish.

Figure 4 is an end elevation of the apparatus shown in Figure 3.

Referring more particularly to the parts, and especially to Figure 1, 1 represents an endless belt mounted in horizontal plane on a suitable frame 2.

This belt has a plurality of fish carriers 3 in the form of channel-shaped members in which the body of the fish can lie so that the longitudinal axis of the fish extends transversely to the direction of movement of the belt. This belt is advanced by any suitable mechanism with a step-by-step movement so as to bring the fish carriers in succession into position in front of the cleaning mechanism 4, at which point the motion of the belt is arrested for a time to permit the fish cleaning mechanism to withdraw the viscera and clean the cavity within the fish.

While this mechanism is operating the bodies of the fish may be held in the carriers by suitable automatic holders 5. The machine is driven by a suitable belt passing over the belt pulley 6. The mechanism includes a transverse cam shaft 7 that extends transversely with respect to the direction of movement of the belt or conveyor 1, and this shaft carries a cam 8 which controls the operation of the cleaning mechanism through the agency of the rocker arm 9 carried on a rock shaft 10. (See Figure 2.) The cleaning mechanism is supported in a casing or box 11 that forms a part of the fixed frame of the machine.

In applying my invention to a machine of this type, I provide a plurality of extractors which operate as a gang and are mounted so that at each rocking movement of the rock shaft 10 they will be moved forward longitudinally into the bodies of the fish and withdrawn so as to extract the viscera.

This mechanism is constructed so as to effect this without rotating the extracting members, and is also provided with means for delivering rinsing water into the cavity within the fish's body as the viscera are extracted.

In Figure 2 I illustrate one of the elements of the gang of extractors. Each element preferably comprises an elongated member 12 in the form of a spindle guided to reciprocate longitudinally in the casing or box 11. The forward end 13 of this member is provided with an expandible head. That is to say, I provide means in the form of one or more dogs that can be operated to assume an expanded or outwardly projected relation when the extractor member has passed to the limit of its forward movement into the fish's body; in other words, at the end of its forward travel. In order to accomplish this, I provide a plurality of dogs 14, which dogs are mounted on pivot pins 15, respectively.

These dogs are capable of assuming a folded relation, such as indicated in Figure 2, at which time each dog is received in a corresponding recess 16 in the head 17 which forms the forward end of the extractor.

Each dog 14 extends in a rearward direction on the head; that is to say, it extends back towards the casing or box 11. This is to enable the dogs to assume an expanded condition (see Figure 3), at which time the dogs will form hooks on the head 17, capable of engaging the viscera of the fish on the return stroke of the member 12.

In order to operate the dogs in unison, I provide a tripping stem 18, which is preferably of tubular form and mounted to slide longitudinally in a bore formed in the member 12. Each dog 14 has a short actuating finger 19 that projects radially inward toward the axis of the member 12 and engages into a corresponding longitudinal slot 20 formed in the end of the tubular tripping stem. At a suitable point on the stem 18 a collar is provided which affords means for producing a relative longitudinal shifting movement of the tripping stem at the end of the forward travel and rear travel of the member 12. For this purpose the rear end 21 of each stem 18 extends beyond the rear end of its corresponding extractor member 12 and carries a collar 22 secured on the stem by means of a small set screw 23.

When the members 12 are in their inactive or withdrawn position, as indicated in Figure 2, the dogs 14 are in a folded relation so as to facilitate the passage of the extractor head 17 longitudinally into the body of the fish. About the end of the forward travel of each member 12 its corresponding collar 22 strikes against a fixed stop 24 that may be attached as indicated in Figure 2 to the adjacent end of the box 11. This produces a relatively rearward movement of the stem 18 with respect to the member 12, and this causes the dogs to project themselves outwardly into their hooking position. (See Figure 3.)

At the end of the return stroke of the extractor member 12 its corresponding collar 22 engages a stop frame 25 which may be secured by a plurality of posts such as the posts 26 to the adjacent end of the box 11. These posts 26 are preferably mounted adjustable so as to enable the stop frame 25 to have its position altered as may be desired.

If desired, the stop 24 may also be mounted so that its position can be adjusted.

In order to supply rinsing water to the extractor, a flexible connection is made to the rear end of the inner tube or tripping stem 18. This connection is preferably in the form of a flexible hose 27. Clearance for this hose is formed in the stop plate 25 by cutting notches such as the notch 28, which has a greater width than the hose but of less width than the diameter of the collar 22.

In order to reciprocate the extractor members 12 in unison we prefer to provide the cross-head 29, which has a bore 30 corresponding to each member 12, and into which the member fits, with a plurality of set screws, such as the set screw 31, to clamp these members in place rigidly in the cross-head. This set screw evidently can also be used to hold the members 12 in more or less forwardly adjusted position.

The cross-head 29 is provided with downwardly projecting bracket 32 (see Figure 2), that is engaged by an arm 33 rigidly attached to the rocker shaft 10 for shifting the cross-head back and forth as the arm rocks to and fro.

This cross-head 29 may evidently be made as wide as necessary to accommodate a gang of extractors. In the present instance, in Figure 1, I have illustrated the device as operating with two extractors, but it could accommodate three in case it is necessary to increase the number of extractors. If there are only two, of course the automatic advancing movement of the belt 1 will be through the width of two fish carriers at each periodic movement. If there were three of these extractors in use, of course the belt would move forward through a distance equal to the width of three of these carriers.

The mode of operation of the mechanism will now be briefly stated. While the conveyor belt is held stationary with two fish bodies aligned with the axes of the extractor members 12, the cam 8 actuates the rock shaft 10 to move the extractors forwardly. When advancing in this way, the expanding heads of the members 12 will pass readily into the body of the fish. These are constructed so that on their return movement they will act as hooks to engage the viscera of the fish and remove the same.

In the construction described, at the end of the forward travel of the members 12, the collar 22, corresponding to each member, engages the fixed stop 24, thereby giving a relatively backward movement to the inner stem 18 with respect to the outer tube 12. This relative movement, through the medium of the slots 20 and the fingers 19, expands the dogs as indicated in Figure 3 so that on the backward movement they will engage the viscera.

At the end of the return movement of each member 12 its collar 22 strikes the stop plate 25, and this gives a relative forward movement of the inner tube 18 which folds the dogs 14 down into their recesses. The reciprocating movement of the extractor members 12 gives a very desirable flushing action to the current of water because it delivers the water with a spurt during the return movement. This assists the returning expanding head in performing its function.

It will be evident that the cross-head 29 affords means for preventing rotation of the members 12 as they are reciprocated.

It is understood that the embodiment of the invention described herein is only one of the many embodiments this invention may take, and I do not wish to be limited in the practice of the invention, nor in the claims, to the particular embodiment set forth.

What I claim is:

1. In a fish cleaning mechanism, the combination of an elongated member, means for reciprocating the same to pass it longitudinally into the fish's body, said member having expandible means including a part at its forward end to hook the viscera of the fish, and capable of assuming a folded position when the member is passing into the fish's body, actuating means for actuating the expanding means to project the same into the viscera of the fish at about the end of the inward travel of said member, said expansible means, when expanded, operating on the return stroke to maintain its expanded condition, engage the viscera, and withdraw the same.

2. In a fish cleaning mechanism, the combination of an elongated non-rotating member, means for reciprocating the same to pass it longitudinally into the fish's body, said member having an expanding head adjacent its inner end including a dog capable of assuming a folded position on the forward stroke of the member while the same is passing into the fish's body, means for expanding the head near the end of the inward travel of the expanding head to engage the viscera of the fish and operating on the return stroke to withdraw the same.

3. In a fish cleaning mechanism, the combination of an elongated member, means for reciprocating the same to pass it longitudinally into the fish's body, said member having an expanding head including a plurality of pivoted dogs capable of assuming a folded position while the said member is passing into the fish's body, means for actuating the expanding head at about the end of the inward travel of the member to expand the dogs to enable them to engage the viscera of the fish, and operating on the return stroke to withdraw the same from the fish.

4. In a fish cleaning mechanism, the combination of an elongated member having expansible hook means at its forward end, means for reciprocating the said member to pass the said member into the fish's body, said hook means operating on the return stroke to withdraw in an expanded condition and withdraw the viscera of the fish.

5. In a fish cleaning mechanism, the combination of an elongated member having hook means at its forward end, means for reciprocating said member with means for preventing rotation thereof on its longitudinal axis to pass the same into the fish's body, said hook means operating on the return stroke of said member to withdraw the viscera of the fish.

6. In a fish cleaning mechanism, the combination of an elongated member, means for reciprocating the same to pass it longitudinally into the fish's body, a plurality of dogs pivotally mounted adjacent the forward end of said member, an actuating member for the dogs extending longitudinal of said member, and means for controlling the actuating member to move the dogs into an expanded position while within the fish's body enabling the same to withdraw the viscera of the fish on the return stroke.

7. In a fish cleaning mechanism, the combination of an elongated member, means for reciprocating the same to pass it longitudinally into the fish's body, expandible dog-means at the inner end of said body, a tripping stem extending longitudinally of the said member, said tripping stem and said dog-means having engaging means enabling the longitudinal movement of the stem relative to the said member to expand the dog means when the said member has passed into the body of the fish, and means cooperating with the tripping stem to actuate the dogs at about the end of the forward travel of the said member to expand the same and enable the dog-means to withdraw the viscera of the fish on the return stroke.

8. In a fish cleaning mechanism, the combination of an elongated member, means for reciprocating the same to pass it longitudinally into the fish's body, expandible dog-means at the inner end of said body, a tripping stem extending longitudinally of the said member, said tripping stem and said dog-means having engaging means enabling the longitudinal movement of the stem relative to the said member to expand the dog-means when the said member has passed into the body of the fish, and means cooperating with the tripping stem to actuate the dogs at about the end of the forward travel of the said member to expand the same and enable the dog-means to withdraw the viscera of the fish on the return stroke, said member having a water duct extending therethrough with a flexible connection for delivering rinsing water at the forward end of the said member.

9. In a fish cleaning mechanism, the combination of an elongated member, means for reciprocating the same to pass it longitudinally into the fish's body, expandible dog-means at the inner end of said body, a tripping stem extending longitudinally of the said member, said tripping stem and said dog-means having engaging means enabling the longitudinal movement of the stem relative to the said member to expand the dog-means when the said member has passed into the body of the fish, and means cooperating with the tripping stem to actuate the dogs at about the end of the forward travel of the said member to expand the same and enable the dog-means to withdraw the viscera of the fish on the return stroke, said tripping stem being of tubular form and operating to conduct water to the forward end of the said member, and a flexible hose connecting with the rear end of the tubular tripping stem.

10. In a fish cleaning mechanism, the combination of a frame, an elongated member mounted to slide in said frame, expandible dog-means carried at the forward end of the said head, a tubular trip stem extending longitudinally through the said member, said trip stem and said dog-means having engaging means enabling a relative longitudinal movement of the trip stem to expand the dog-means, means for reciprocating the said member, a trip collar carried by the trip stem, relatively fixed means mounted on the frame to cooperate with the said trip member to move the dog-means into their expanded position at about the beginning of the return stroke of said member, and flexible hose connected to the rear end of the tubular tripping stem for conducting rinsing water to the inner end of the said member.

11. In a fish cleaning mechanism, the combination of a frame, a plurality of elongated members actuated to slide longitudinally on said frame, a cross-head connected with said members for reciprocating the same, means for reciprocating the cross-head to cause the forward ends of said members to pass into the fish's body, expandible dog-means carried at the forward ends of said members, a tripping stem corresponding to each of said members and connected with its corresponding dog-means for expanding the same at about the end of the forward travel of said members, and fixed means on said frame cooperating with said tripping stem to hold the dog-means in a folded condition on the forward stroke to enable the same to engage the viscera of the fish and withdraw the same.

BURT C. YOUMAN.